(12) United States Patent
Hesmer et al.

(10) Patent No.: US 7,770,101 B2
(45) Date of Patent: *Aug. 3, 2010

(54) MAINTAINING SCREEN AND FORM STATE IN PORTLETS

(75) Inventors: Stephan Hesmer, Holzgerlingen (DE);
David B. Lection, Raleigh, NC (US);
Eric L. Masselle, Raleigh, NC (US);
Mohamad R. Salahshoor, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 945 days.

This patent is subject to a terminal disclaimer.

(21) Appl. No.: 11/555,337

(22) Filed: Nov. 1, 2006

(65) Prior Publication Data

US 2007/0055942 A1    Mar. 8, 2007

Related U.S. Application Data

(63) Continuation of application No. 10/448,365, filed on May 29, 2003, now Pat. No. 7,146,563.

(51) Int. Cl.
*G06F 17/00* (2006.01)
(52) U.S. Cl. .................. 715/221; 715/222; 715/234; 715/742; 715/760; 707/E17.111
(58) Field of Classification Search .................. None
See application file for complete search history.

(56) References Cited

U.S. PATENT DOCUMENTS 5,894,554 A * 4/1999 Lowery et al. ............. 709/203

6,094,662 A    7/2000   Hawes .................. 707/104
6,112,242 A    8/2000   Jois et al. ............... 709/225

(Continued)

FOREIGN PATENT DOCUMENTS

EP        1 189 146        3/2002

OTHER PUBLICATIONS

*Multi web screen for intranet user, Research Disclosure*, pp. 1042-1043, (Jun. 2001).

(Continued)

*Primary Examiner*—Doug Hutton
*Assistant Examiner*—James H Blackwell
(74) *Attorney, Agent, or Firm*—Andro S. Gibbs, Esq.; Steven M. Greenberg, Esq.; Carey, Rodriguez, Greenberg & Paul, LLP

(57) ABSTRACT

A portlet state maintenance system can include a portal page setup component configured to generate a logical form in a single portal page from a multiplicity of forms defined within portlet markup aggregated into the single portal page. A portal state save component further can be configured to save state values for selected portlets defined within the logical form. Finally, a portal state restore component can be configured to restore the saved state values in refreshed portlet markup for the selected portlets. Notably, a refresh timing component further can be configured to embed submit auto-initiation logic in the single portal page responsive to identifying a dynamic refresh requirement associated with the portlet markup in the single portal page. Finally, a portlet markup cache can be coupled to the portal state restore component.

8 Claims, 4 Drawing Sheets

U.S. PATENT DOCUMENTS

| | | | |
|---|---|---|---|
| 6,192,382 B1 | 2/2001 | Lafer et al. | 707/513 |
| 6,211,874 B1 | 4/2001 | Himmel et al. | 345/340 |
| 6,327,598 B1 | 12/2001 | Kelley et al. | 707/513 |
| 6,341,292 B1 | 1/2002 | Cho et al. | 707/203 |
| 6,397,217 B1 | 5/2002 | Melbin | 707/10 |
| 6,424,979 B1 | 7/2002 | Livingston et al. | 707/511 |
| 6,871,197 B1 * | 3/2005 | Johnson | 706/61 |
| 7,093,020 B1 * | 8/2006 | McCarty et al. | 709/229 |
| 7,117,431 B2 * | 10/2006 | Robison et al. | 715/224 |
| 7,152,203 B2 * | 12/2006 | Gao et al. | 715/240 |
| 7,251,693 B2 * | 7/2007 | Stull et al. | 709/225 |
| 7,266,806 B2 * | 9/2007 | Choi et al. | 717/108 |
| 7,346,843 B2 * | 3/2008 | Hind et al. | 715/234 |
| 7,548,957 B1 * | 6/2009 | Wichmann et al. | 709/217 |
| 2002/0032701 A1 | 3/2002 | Gao et al. | 707/513 |
| 2002/0052954 A1 | 5/2002 | Polizzi et al. | 709/225 |
| 2002/0055956 A1 * | 5/2002 | Krasnoiarov et al. | 707/513 |
| 2002/0083132 A1 | 6/2002 | Holland et al. | 709/203 |
| 2002/0091732 A1 * | 7/2002 | Pedro | 707/505 |
| 2002/0111992 A1 | 8/2002 | Copeland et al. | 709/203 |
| 2002/0112032 A1 | 8/2002 | Martin et al. | 709/219 |
| 2002/0152239 A1 | 10/2002 | Bautista-Lloyd et al. | 707/513 |

OTHER PUBLICATIONS

*Customizing Portals and Portlets, BEA WebLogic Portal 4.0*, pp. 1-35, (Nov. 2002), <http://edocs.bea.com/wlp/docs40/portal/devbasic.html>.

*Writing portlets, WebSphere Portal*, pp. 1-16, (Nov. 2002), <http://www-3.ibm.com/software/webservers/portal/library/enable/InfoCenter/wps/wpswrplt.html>.

* cited by examiner

MAINTAINING SCREEN AND FORM STATE IN PORTLETS

BACKGROUND OF THE INVENTION

1. Statement of the Technical Field

The present invention relates to the field of portals and portlets and more particularly to the maintenance of screen and form state in portlets.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

For the interactive portlet applications, a two-way portlet user interface can be provided. In the two-way user interface of the portlet application, user input can be forwarded to the portal server through the use of a submit action in which the user input can be posted or otherwise provided to the portal server. Subsequently, the portal server can forward the user input to the appropriate portlet application in which the user input can be processed by the application portlet. In this way, the portal can be viewed as a logical extension to the Web application in which the Web application has been formalized in terms of user and application interface. Some have postulated that the portal merely represents the next generation of the Web application.

With the enhanced functionality of the portal comes a price of complexity in managing multiple application states, both in the portal, and at the client computing device. This complexity has led to a limitation given current content browsing technology for use in the conventional client computing device. More particularly, when a user initiates a submit action in connection with a portlet user interface in the portal page, the input data in the portlet user interface can be returned to the portlet application running in the portal server. Yet, where data had been provided within multiple portlet user interfaces in the portal page, all but the data provided in the portlet user interface associated with the running portlet application will be lost.

Notably, some portlets periodically auto-initiate a submit event at regular intervals to trigger the portal server's refreshing of the latest state of the portlet application. The periodic auto-initiation of a submit event in a portlet user interface can magnify the problem of lost portlet data because at the time of submit, the portlet requesting the refresh may not necessarily have focus in the portal page. Moreover, the auto-initiation of a submit event in one portlet user interface may arise concurrently with the manual initiation of a submit event in another portlet user interface in the portal page. As the conventional content browser only can post the form data associated with the first occurring submit, the subsequent manually initiated submit will fail to forward the data portlet user interface data to the portal server for processing.

SUMMARY OF THE INVENTION

The present invention is a system, method and apparatus for maintaining the form and application state of a portlet application and corresponding portlet user interface. In accordance with the inventive arrangements, in association with one or more submit requests received from one or more corresponding portlets disposed in a portal page, the state for each other portlet in the portal page can be stored while the corresponding portlets can be refreshed by associated portlet applications. Once the corresponding portlets have been refreshed, the resulting data can be applied to the portal page as can the stored state for each other portlet in the portal page. In this way, the state of every portlet in the portal page can be maintained without risk of loss of data, regardless of the focus of the portal page.

A portlet state maintenance system can include a portal page setup component configured to generate a logical form in a single portal page from a multiplicity of forms defined within portlet markup aggregated into the single portal page. A portal state save component further can be configured to save state values for selected portlets defined within the logical form. Finally, a portal state restore component can be configured to restore the saved state values in refreshed portlet markup for the selected portlets. Notably, a refresh timing component further can be configured to embed submit auto-initiation logic in the single portal page responsive to identifying a dynamic refresh requirement associated with the portlet markup in the single portal page. Finally, a portlet markup cache can be coupled to the portal state restore component.

A portlet state maintenance method can include the step of receiving a submit request specifying a set of form field data in a portal page comprising a multiplicity of portlets aggregated within the portal page. A specific portlet in the portal page can be identified as a source of the submit request and a submit request and portions of the form field data associated with the specific portlet can be forwarded to a portlet application corresponding to the specific portlet. Others of the form field data can be associated with respective ones of the portlets and subsequently stored. Each portlet application corresponding to the respective ones of the portlets can be refreshed to produce refreshed portal markup, and form fields in the refreshed portal markup can be populated with the stored form field data. Finally, the refreshed portal markup and portal markup produced by the forwarded submit request can be aggregated in a new portal page which can be forwarded in response to the received submit request.

In a preferred aspect of the invention, the aggregating step can include the steps of stripping tags from the refreshed and produced portal markup which denote individual forms in each of the portlets, and adding a single set of form tags to the new portal page to denote a single, logical form. In this regard, the stripping step can include the step of converting each <FORM> tag in the refreshed and produced portal markup to a comment tag. The aggregating step also can include the steps of identifying specific portal applications requiring a dynamic refresh and determining a refresh interval for each of the identified specific portal applications. Each determined refresh interval can be compared to compute an earliest required refresh time. Finally, a script can be embedded in the portal page to trigger an auto-initiated submit request at the computed earliest required refresh time.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for maintaining the state of a portal page responsive to one or more refresh requests initiated in portlets in the portal page in requesting client content browser. More particularly, in response to the issuance of one or more submit action in one or more corresponding portlets in the portal page, the state of every other portlet in the portal page can be identified and stored in the portal server pending the processing of the submit actions. Once the submit actions have been processed by the respective portlet applications, the resulting state can be combined with the stored state to produce a newly aggregated portal page which can be re-distributed to the requesting client content browser.

Figure 1:
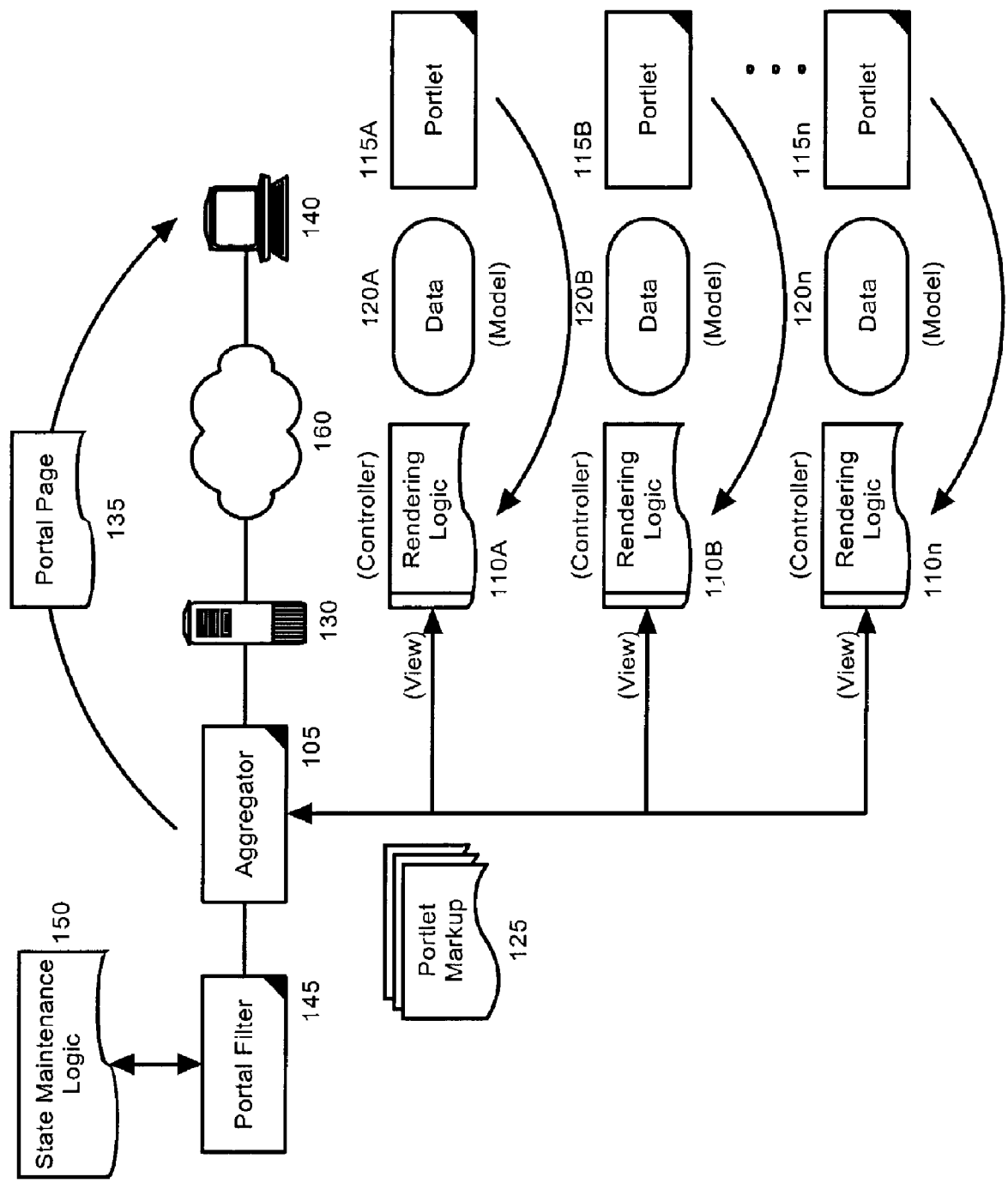
FIG. 1 is a schematic illustration of a portal server system which has been configured to maintain the state of every portlet in a portal page which has been distributed to a content browsing client.

FIG. 1 is a schematic illustration of a portal server system which has been configured to maintain the state of every portlet in a portal page which has been distributed to a content browsing client. The portal server system can include a portal page 135 communicatively coupled to a selection of portlet applications 115A, 115B, 115n through a portal server 130. Each portlet application 115A, 115B, 115n can produce a view based upon portlet data 120A, 120B, 120n in the form of portlet markup 125 through corresponding rendering logic 110A, 110B, 110n. Notably, the rendering logic 110A, 110B, 110n can be active markup such as a JSP, in which logical scriptlets can be embedded to produce specific markup language tags.

A portlet aggregator 105 can be coupled to each portlet application 115A, 115B, 15n to receive the portlet markup 125 and to aggregate the portlet markup 125 into view in the portal page 135. By aggregation, it is meant that the individual markup language blocks produced by each portlet 115A, 115B, 115n can be combined into a single cohesive markup language document configured for distribution to and use within a conventional content browser. In this regard, the portal page 135 can be disposed in the portal server 130 from which the portal 135 can be accessed by client content browsing devices 140 over a computer communications network 160 such as a local computer communications network, for instance a private intranet, or a global computer communications network, for instance the public Internet.

Importantly, a portal filter 145 can be coupled to the portal aggregator 105. The portal filter 145 can intercept requests to and responses from the aggregator 105. Through this interception mechanism, the portal filter 145 can process logic responsive to the intercepted requests or intercepted responses. In accordance with the inventive arrangements, the portal filter 145 can be configured to process state maintenance logic 150 in response to the interception of a submit request. The state maintenance logic 150 can store the state of each portlet in a portal page 135 which has not initiated the submit requests.

Conversely, the state maintenance logic 150 can request a refreshing of the portlet applications 15A, 115B, 115n associated with those portlets responsible for the submit request. Once the portlet applications 115A, 115B, 115n have produced refreshed portlet markup 125 in response to the refreshing requested by the state maintenance logic 150, the refreshed portlet markup 125 can be combined with the stored states of each other portlet in the portal page 135 which had not initiated the submit requests. Subsequently, the combined portal page 135 can be returned to the client content browsing device 140.

Notably, to ensure that each portlet in the portal page 135 can provide its state to the state maintenance logic 150 in response to a submit request, even where the submit request had been initiated in other portlets in the portal page 135, each form component of each portlet in the portal page 135 can be combined into a single portal form. In this regard, the state maintenance logic 150 can strip the form tags of the portlet markup while wrapping the aggregated portal page in a single form tag. In this way, each form of each portlet in the portal page 135 will be viewed as just another element of a single form in the portal page 135. Consequently, any submit request initiated in any portlet in the portal page 135 will cause the name value pairs of the entire form to be forwarded to the portal server 130.

It will be recognized by the skilled artisan that by coupling the state maintenance logic 150 to the aggregator 105 through a portal filter, the state maintenance logic 150 can be applied to any portal server 130, regardless of the source and configuration of the portal server 130. Specifically, it is well known that portal filters generally implement a set of interfaces that allow the portal filter to be connected in the request and response call sequence to each portlet. Still, the invention is not so limited strictly to a portal filter implementation. Rather, the state maintenance logic 150 can be more closely linked to the portal server. For example, in an alternative aspect of the invention the state maintenance logic 150 can be incorporate into the portal server 130 itself.

Figure 2:
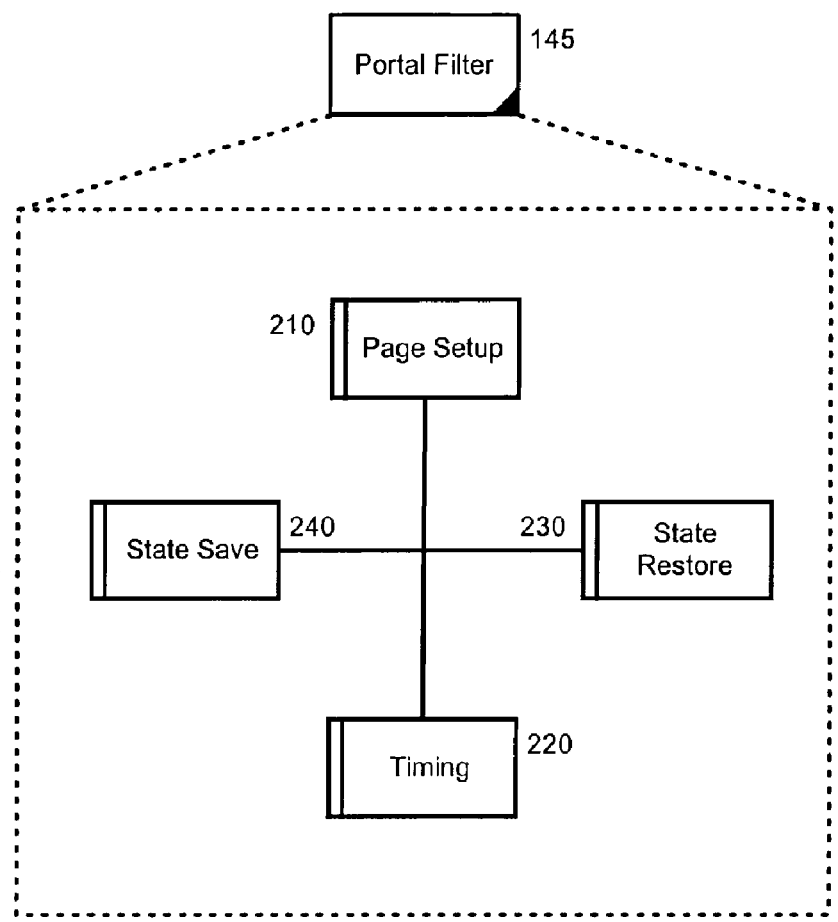
FIG. 2 is a block illustration of a system for maintaining state in a portal page.

FIG. 2 is a block illustration of a system for maintaining state in a portal page. As it will be apparent to the skilled artisan, the system of the present invention can include four components: a portal page setup component 210, a portlet state save component 240, a portlet state restore component 230, and a portlet refresh timing component 220. Each of the foregoing components can be coupled to a portal server through a portal filter 145, though the invention is not so limited to a portal filter configuration as had been previously noted.

In accordance with the present invention, it is preferred that when a portlet within a portal page generates a submit event, all portlets within the portal page submit their respective form contents to the portal server. To ensure that such is the case, the portal page setup component 210 can combine the form markup of each portlet within the portal page into a single, logical form in the portal page. In order to seam lessly undertake the combination of all portlet forms into a single portal form, the <FORM> tags of each portlet form can be stripped therefrom, for instance by converting each <FORM> tag into a comment tag. In this respect, the tag <FORM action="save"> can be converted to <!-FORM action="save"-->, while the tag </FORM> can be converted to <!-/FORM->.

As it will be recognized by the skilled artisan, to perform the aforementioned conversion, the state maintenance logic must scan the aggregation stream to identify each <FORM> tag. To avoid the overhead of a scanning process as such, each the portlet rendering logic can avoid the use of hard-coded <FORM> tags with the use of script tags such as the JSP tags: <wps:form action="save"/>, and <wps:endform/>. The script tags, in turn, can cause the generation of commented FORM tags. In any case, once the <FORM> tags have been stripped from the portlet markup, the aggregation stream can be wrapped with a single <FORM> tag at each end of the aggregation stream. Accordingly, a single, logical form can result.

In response to the receipt of one or more submit events generated in one or more respective portlets in a portal page, the portlet state save component 240 can save the state of each portlet in the portlet page which had not generated a submit event. More particularly, when a composite submit request is received from the client content browser, the portlet state save component 240 can save the value of any fields in any forms for all portlets except for the portlets which had generated the submit events. As the field values will be associated with specific fields in a single, virtual form, the portlet state save component can identify the portlet associated with any one field in the virtual form by way of a conventional namespace processing mechanism included with typical portal server systems. For those portlets which had generated the submit events, the portlet state save component 240 can deliver the submit event to each of such corresponding portlet applications where the events can be individually processed.

Once the submit event has been delivered to each of the portlet applications, the portlet applications can produce an updated state and respective portlet markup in response. The portlet markup can be returned to the aggregator where a now portal page can be constructed for transmission to the client content browser. To that end, each of the other portlet applications can be asked to refresh their respective portlet markup. As the aggregator receives the aggregation stream, the portlet state restore component 230 can restore the saved values into their respective portlets in the portal page. The resulting composite portal page can be returned to the client content browser, having included therein both the refreshed data and the restored data within a single virtual form.

Notably, though as part of the portlet aggregation process each of the portlet applications which had not processed a submit request still can be requested to refresh their respective views, it will be recognized by the skilled artisan that the refresh process can produce undesirable latencies in the responsiveness of the end to end submit process. These latencies will appear to the end user as a delay in processing the submit request or requests. Consequently, in a preferred aspect of the invention, a cache (not shown) can be coupled to the portlet state restore component 230 so that, where the caching rules permit, the entire portlet view can be restored from the cache without requiring a time consuming refresh call to the portlet application.

Figure 3:
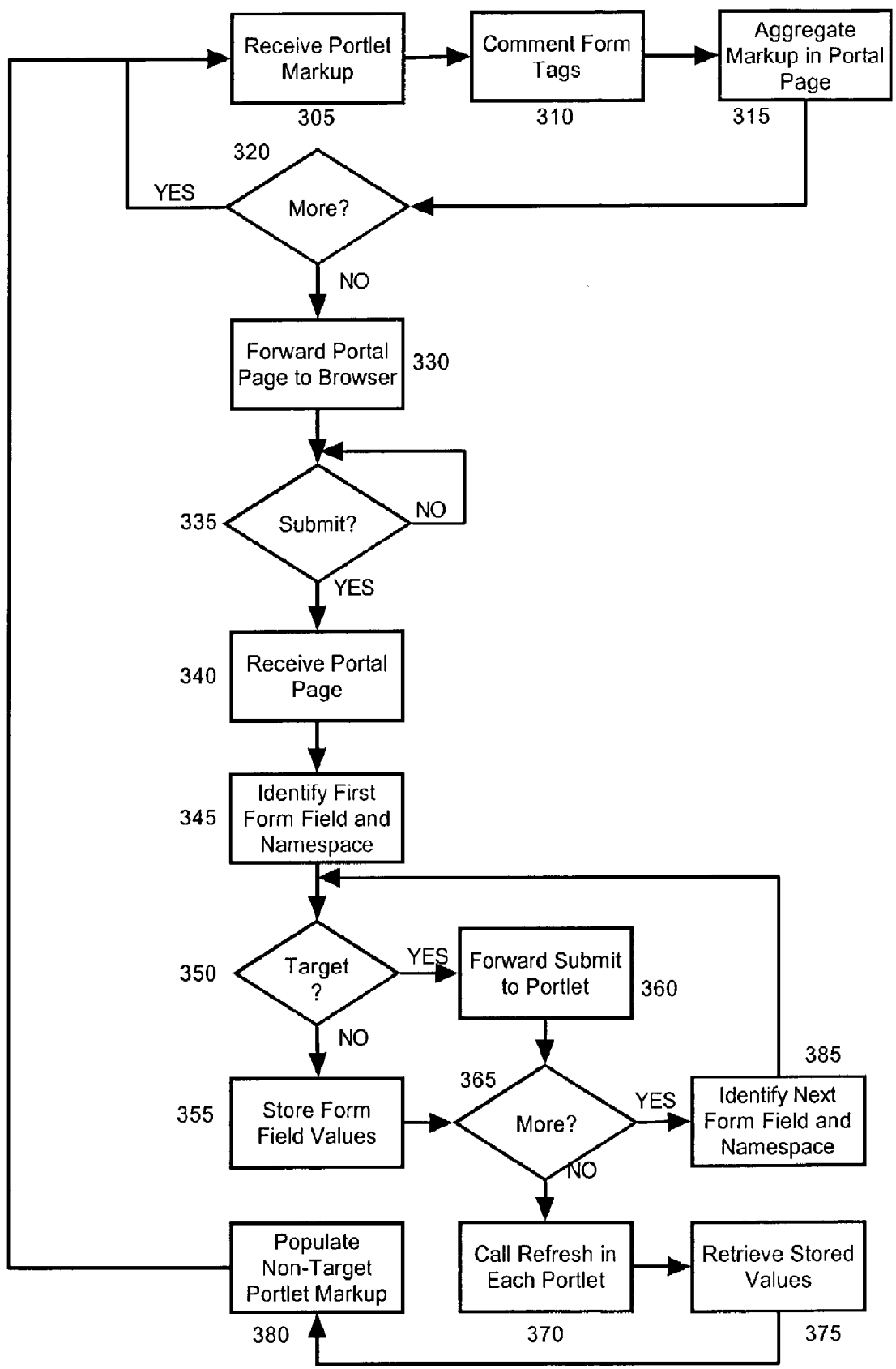
FIG. 3 is a flow chart illustrating a process for maintaining state in a portal page; and, FIG. 4 is a schematic illustration of a portal server system which has been configured to manage auto-initiated refresh requests in a portal page.

In furtherance of explaining the setup, save and restore aspects of the present invention, FIG. 3 is a flow chart illustrating a preferred process for maintaining state in a portal page. Beginning in block 305, portlet markup can be received in an aggregation stream. In block 310, the tags within the portlet markup which denote the presence of a form can be neutralized, for instance by way of converting the tags to a comment tag. In block 315, the portlet markup can be aggregated into a portal page having a single logical form. If in decision block 320 additional portlet markup remains to be processed, the receiving, neutralizing and aggregating steps can be repeated for the additional portlet markup. Otherwise, the process can continue through block 330 in which the portal page is forwarded to a requesting client content browser.

In decision block 335, it can be determined whether one or more submit events have been received from the portal page. If so, in block 340, the submit event or events can result in the receipt in the portal server of name value pairs or other request payload from the client content browser. In block 345, a first form field in the request can be identified as can the namespace for the first form field. In decision block 350, it can be determined whether the portlet associated with the namespace had generated any of the received submit events. If so, in block 360 the name value pair for the field can be forwarded to a corresponding portlet application along with a submit event. In this way, the portlet application can process the submit request as if the request had been directly exclusively at the portlet application.

If, however, in block 350 it is determined that the portlet associated with the namespace had not generated any of the received submit events, in block 355 the name value pair for the form field can be stored. Subsequently, in decision block 365 it can be determined if more fields remain to be analyzed in the request. Where additional fields in the request are to analyzed, in block 385 a next form field can be selected and the name space identified. The process can repeat, then, through blocks 350 through 365 as in the previous case.

Where no more form fields remain to be analyzed as determined in block 365, in block 370 each portlet application having an associated stored state can be requested to refresh itself. In response, the portlet application can produce a refreshed view in the form of portlet markup. Once the refreshed portlet markup is received from each portlet application which can result from both the refresh and submit requests forwarded to the respective portlet applications, in block 375 the stored values can be retrieved for each portlet and in block 380 the refreshed portlet markup can be populated with the stored values and the process of blocks 305 through block 330 can produce and forward the resulting portal page.

Figure 4:
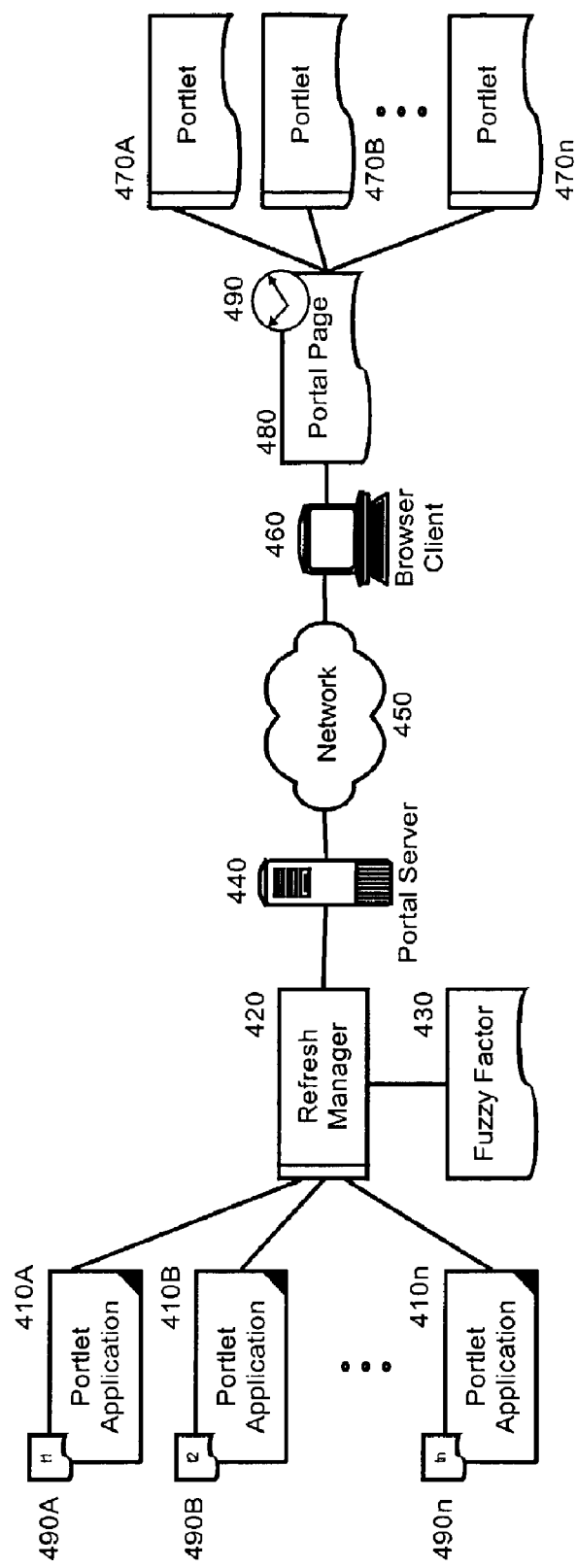

Returning now to FIG. 2, it will be apparent that a refresh timing component 220 also can be included in the system of the present invention. The timing component 220 of FIG. 2 can support auto-initiated refresh requests in portlet portions of the portal page. Specifically, FIG. 4 is a schematic illustration of a portal server system which has been configured to manage auto-initiated refresh requests in a portal page 480. To support auto-initiated refresh requests, each portlet application 410A, 410B, 410n can specify a refresh interval 490A, 490B, 490n. The refresh interval 490A, 490B, 490n can be expressed, for instance, through a portlet descriptor, or through an application programming interface for the portlet application 410A, 410B, 410n.

A refresh manager 420 can be coupled to the portal aggregator (not shown) of the portal server 440. The refresh manager 420, at the time of aggregation, can identify whether any portlet 470A, 470B, 470n of the portal page 480 requires dynamic refresh. Based upon all refresh intervals 490A, 490B, 490n for all portlets 470A, 470B, 470n in the portal page 480, an earliest required refresh time 490 can be computed. Subsequently, the refresh manager 420 can add a script to the portal page 480. The script can execute a loop which periodically determines whether the specified refresh time 490 has elapsed. If so, the script can auto-initiate a submit request from within the browser client 460 to the portal server 440 over the network 450.

Upon receipt of the submit request, it can be determined which of the portlet applications 410A, 410B, 410n require a refresh resulting in a back-end refresh request to such portlet applications 410A, 410B, 410n. It will be recognized by the skilled artisan that multiple, repetitive auto-initiated refresh events can cause undesirable latencies in the performance of the portal page 480. Consequently, a fuzzy factor 430 can be applied to the refresh manager 420. Whenever a submit request is received in the refresh manager 420, notwithstanding the association of the submit request with a particular one of the portlets 410A, 410B, 410n, the other portlets 410A, 410B, 410n can be inspected to determine whether their respective refresh intervals fall within the fuzzy factor 430. If so, those other portal applications 410A, 410B, 410n determined to all within the fuzzy factor 430 also can be refreshed so as to not require additional refresh cycles. Accordingly, all proximately scheduled refresh events can be processed concurrently in a single refresh cycle.

The present invention can be realized in hardware, software, or a combination of hardware and software. An implementation of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A portlet state maintenance system comprising:
    a processor;
    a portal page setup component connected to the processor and configured to generate a logical form in a single portal page from a plurality of forms defined within portlet markup aggregated into said single portal page;
    a portal state save component connected to the processor and configured to save state values for selected portlets defined within said logical form; and,
    a portal state restore component connected to the processor and configured to restore said saved state values in refreshed portlet markup for said selected portlets.

2. The system of claim 1, further comprising a refresh timing component configured to embed submit auto-initiation logic in said single portal page responsive to identifying a dynamic refresh requirement associated with said portlet markup in said single portal page.

3. The system of claim 1, further comprising a portlet markup cache coupled to said portal state restore component.

4. A portlet state maintenance method comprising the steps of:
    receiving a submit request specifying a set of form field data in a portal page comprising a plurality of portlets aggregated within said portal page;
    identifying a specific portlet in said portal page as a source of said submit request and forwarding a submit request and portions of said form field data associated with said specific portlet to a portlet application corresponding to said specific portlet;
    associating others of said form field data with respective ones of said portlets, storing said others of said form field data, refreshing each portlet application corresponding to said respective ones of said portlets to produce refreshed portal markup, and populating form fields in said refreshed portal markup with said stored form field data; and,
    aggregating said refreshed portal markup and portal markup produced by said forwarded submit request in a new portal page; and,
    forwarding said portal page in response to said received submit request.

5. The method of claim 4, wherein said aggregating step comprises the steps of:
    stripping tags from said refreshed and produced portal markup which denote individual forms in each of said portlets; and,
    adding a single set of form tags to said new portal page to denote a single, logical form.

6. The method of claim 5, wherein said stripping step comprises the step of converting each <FORM> tag in said refreshed and produced portal markup to a comment tag.

7. The method of claim 4, further comprising the step of caching said refreshed and produced portal markup.

8. The method of claim 7, wherein said refreshing step comprises the step retrieving cached ones of refreshed portal markup in lieu of refreshing each portlet application corresponding to said respective ones of said portlets to produce refreshed portal markup.

* * * * *